(12) United States Patent
Uemura (10) Patent No.: US 9,417,505 B2
(45) Date of Patent: Aug. 16, 2016

(54) LENS BARREL AND IMAGE PICKUP APPARATUS WITH A MECHANISM FOR ABSORBING AN EXTERNAL IMPACT

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/554,936

(22) Filed: Nov. 26, 2014

(65) Prior Publication Data

US 2015/0153541 A1 Jun. 4, 2015

(30) Foreign Application Priority Data

Dec. 2, 2013 (JP) ................................. 2013-248882

(51) Int. Cl.
*G03B 13/34* (2006.01)
*G02B 7/10* (2006.01)

(52) U.S. Cl.
CPC ................ *G03B 13/34* (2013.01); *G02B 7/102* (2013.01)

(58) Field of Classification Search
CPC ............................. G03B 13/34; G02B 7/102
USPC ......................................................... 348/374
See application file for complete search history.

(56) References Cited

U.S. PATENT DOCUMENTS

| 5,701,208 | A | * | 12/1997 | Sato | G02B 7/10 |
| | | | | | 359/696 |
| 6,075,655 | A | * | 6/2000 | Funahashi | G02B 7/102 |
| | | | | | 359/696 |
| 2005/0270412 | A1 | * | 12/2005 | Kamon | H04N 5/235 |
| | | | | | 348/362 |
| 2010/0165488 | A1 | * | 7/2010 | Ishimasa | G02B 7/08 |
| | | | | | 359/740 |

FOREIGN PATENT DOCUMENTS

| JP | 08-110456 A | 4/1996 |
| JP | 2002-195313 A | 7/2002 |
| JP | 2002-276693 A | 9/2002 |
| JP | 2003-057522 A | 2/2003 |
| JP | 2003-315655 A | 11/2003 |

* cited by examiner

*Primary Examiner* — Gevell Selby
(74) *Attorney, Agent, or Firm* — Cowan, Liebowitz & Latman, P.C.

(57) ABSTRACT

A lens barrel includes an extendable barrel unit, a drive unit configured to drive the barrel unit so as to extend the barrel unit, and a transmission unit configured to transmit a drive force of the drive unit to the barrel unit, the transmission unit includes a first gear and a second gear coaxially disposed and a biasing member configured to bias at least one of the first gear and the second gear such that the drive force is transmitted between the first gear and the second gear, and the transmission unit is configured to block transmission of the drive force between the first gear and the second gear depending on a rotational force applied to at least one of the first gear and the second gear.

10 Claims, 8 Drawing Sheets

LENS BARREL AND IMAGE PICKUP APPARATUS WITH A MECHANISM FOR ABSORBING AN EXTERNAL IMPACT

BACKGROUND OF THE INVENTION

1. Field of the Invention

The present invention relates to a lens barrel and an image pickup apparatus including a clutch mechanism that absorbs an impact from an outside of the lens barrel or the image pickup apparatus.

2. Description of the Related Art

Conventionally, a lens barrel and an image pickup apparatus capable of changing a focal length of an image pickup lens by extending each lens unit that constitute the image pickup lens toward an object side have been known. For example, when an external impact is applied to the lens barrel in an extended state of the image pickup lens, an excess load is applied to a gear that constitutes a transmission mechanism of a drive force. In this time, cogs of the gear may be chipped off and thus a stable operation of the lens barrel may be difficult.

Accordingly, a lens barrel which mounts a mechanism (an impact absorption mechanism) to prevent damages of the gear has been known. Commonly, the transmission mechanism of the drive force is configured to couple a motor with a barrel unit via a two-stage gear, and thus the drive force of the motor is transmitted to the barrel unit while the two-stage gear reduces the speed of the drive force.

Japanese Patent Laid-open No. 2002-195313 discloses an overload clutch device using a coil spring as an impact absorption mechanism. Specifically, the coil spring is disposed in a space provided inside one gear of two gears that constitute a two-stage gear. In this configuration, when a great force is applied to the gear, the gear spins out and thus the damages of the gear can be prevented. On the other hand, Japanese Patent Laid-open Nos. 2002-276693 and 2003-315655 disclose configurations of using a plate spring and a C-shaped spring instead of the coil spring.

However, in the configuration disclosed in Japanese Patent Laid-open No. 2002-195313, it is necessary to dispose the coil spring inside the gear, and thus the size of a clutch mechanism is enlarged. In addition, it is necessary to provide a member to prevent the coil spring from being released from the gear. In the configurations disclosed in Japanese Patent Laid-open Nos. 2002-276693 and 2003-315655, the plate spring and the C-shaped spring are disposed inside the gear, and thus the degree of freedom of designing the spring is small and it is difficult to achieve a stable clutch operation.

SUMMARY OF THE INVENTION

The present invention provides a lens barrel and an image pickup apparatus capable of performing a stable operation without increasing in size of a clutch mechanism.

A lens barrel as one aspect of the present invention includes an extendable barrel unit, a drive unit configured to drive the barrel unit so as to extend the barrel unit, and a transmission unit configured to transmit a drive force of the drive unit to the barrel unit, the transmission unit includes a first gear and a second gear coaxially disposed and a biasing member configured to bias at least one of the first gear and the second gear such that the drive force is transmitted between the first gear and the second gear, and the transmission unit is configured to block transmission of the drive force between the first gear and the second gear depending on a rotational force applied to at least one of the first gear and the second gear.

An image pickup apparatus as another aspect of the present invention provides an image pickup element configured to photoelectrically convert an optical image to output an image signal and the lens barrel.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
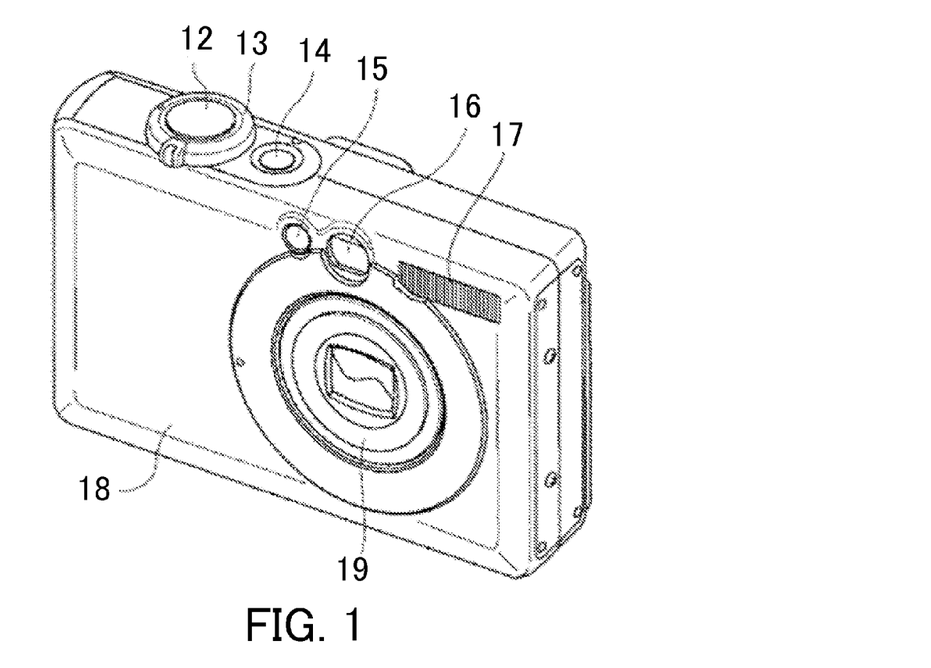
FIG. 1 is an external perspective view of an image pickup apparatus including a lens barrel in an embodiment.
Figure 2:
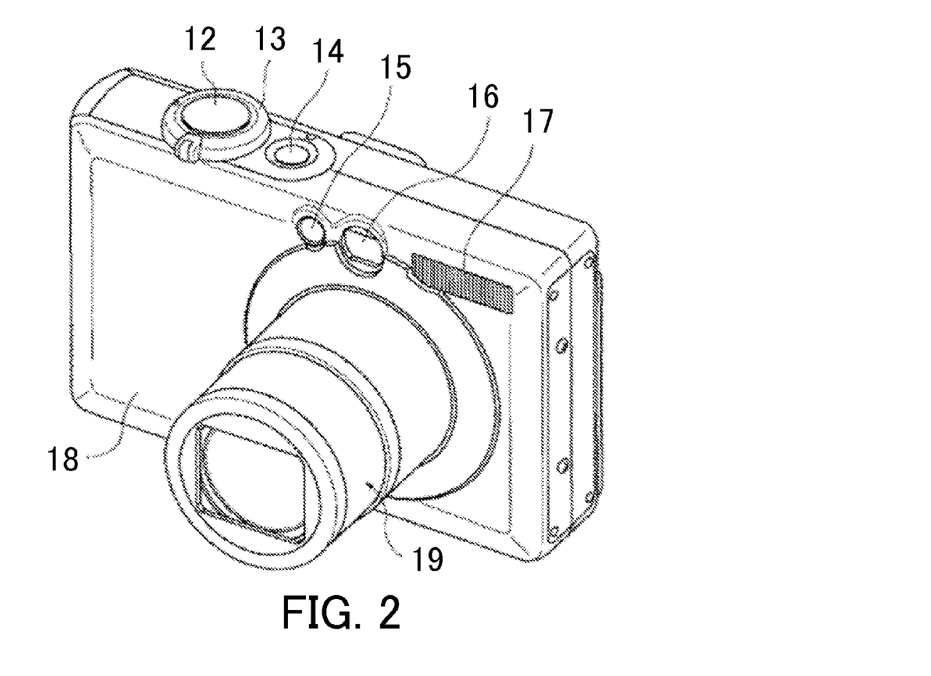
FIG. 2 is an external perspective view of the image pickup apparatus in a state where power is turned on in the embodiment.
Figure 3:
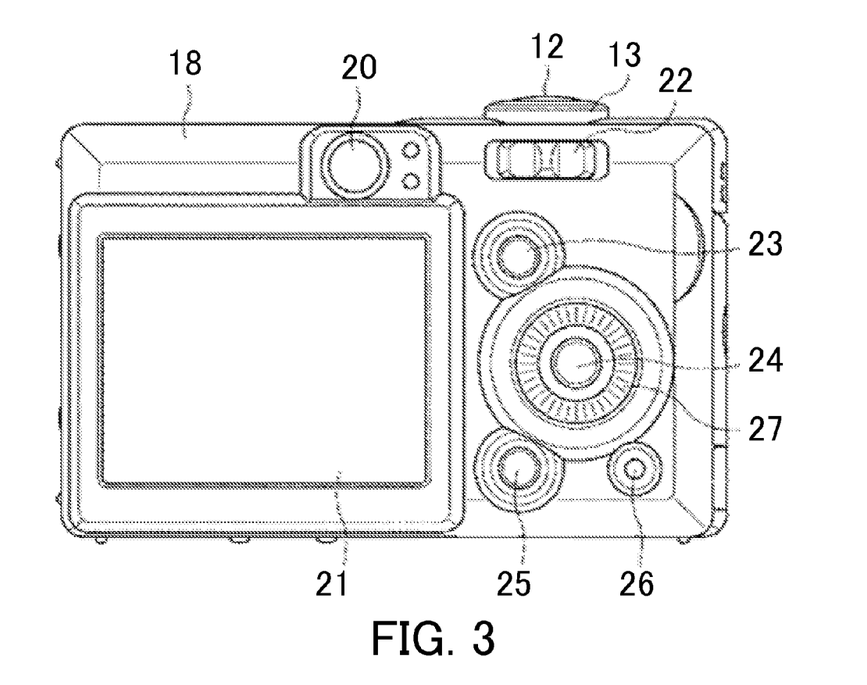
FIG. 3 is a back view of the image pickup apparatus in the embodiment.
Figure 4:
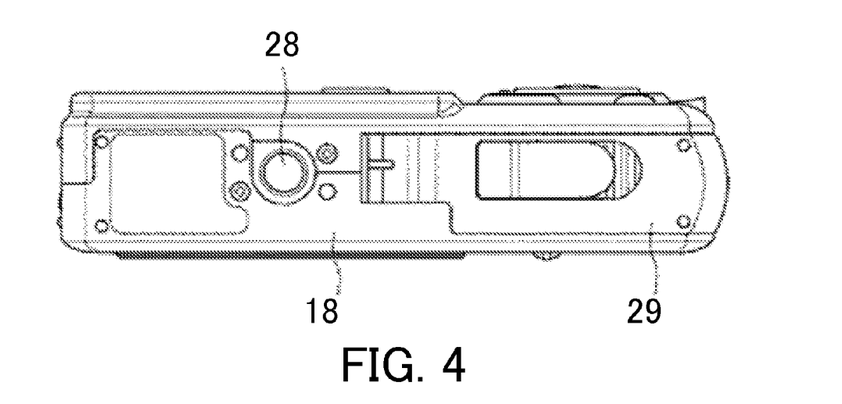
FIG. 4 is a bottom view of the image pickup apparatus in the embodiment.

First of all, referring to FIGS. 1 to 4, an image pickup apparatus including a lens barrel in the embodiment will be described. FIG. 1 is an external perspective view of an image pickup apparatus (digital camera 18) including a lens barrel when viewed from a front side. FIG. 2 is an external perspective view of the digital camera 18 of FIG. 1 in a state where the power of the digital camera 18 is turned on. FIG. 3 is a back view of the digital camera 18, and FIG. 4 is a bottom view of the digital camera 18. In the digital camera 18 of the embodiment, a lens barrel 19 (barrel unit) is capable of extending when the power is turned on (at the time of capturing an image).

As illustrated in FIGS. 1 and 2, the digital camera 18 of the embodiment includes a zoom mechanism that moves a lens unit between an image capturing position (extended position) and a retracted position in an optical axis direction to change a photographing magnification. At a front surface of the digital camera 18, a finder 16 that determines a composition of an object, an auxiliary light source 15 that is used to perform photometry and focus detection, a strobe 17, and the lens barrel 19 (barrel unit) are provided. At an upper surface of the digital camera 18, a release button 12, a power switching button 14, and a zoom switch 13 are provided. As illustrated in FIG. 3, at the back surface of the digital camera 18, operating buttons 22 to 27, a display 21 such as an LCD, and a finder eyepiece 20 are provided. As illustrated in FIG. 4, at the bottom surface of the digital camera 18, a tripod mounting unit 28, a memory card drive 42 (see FIG. 5), and a cover of a battery insertion unit (not illustrated) are provided.

Figure 5:
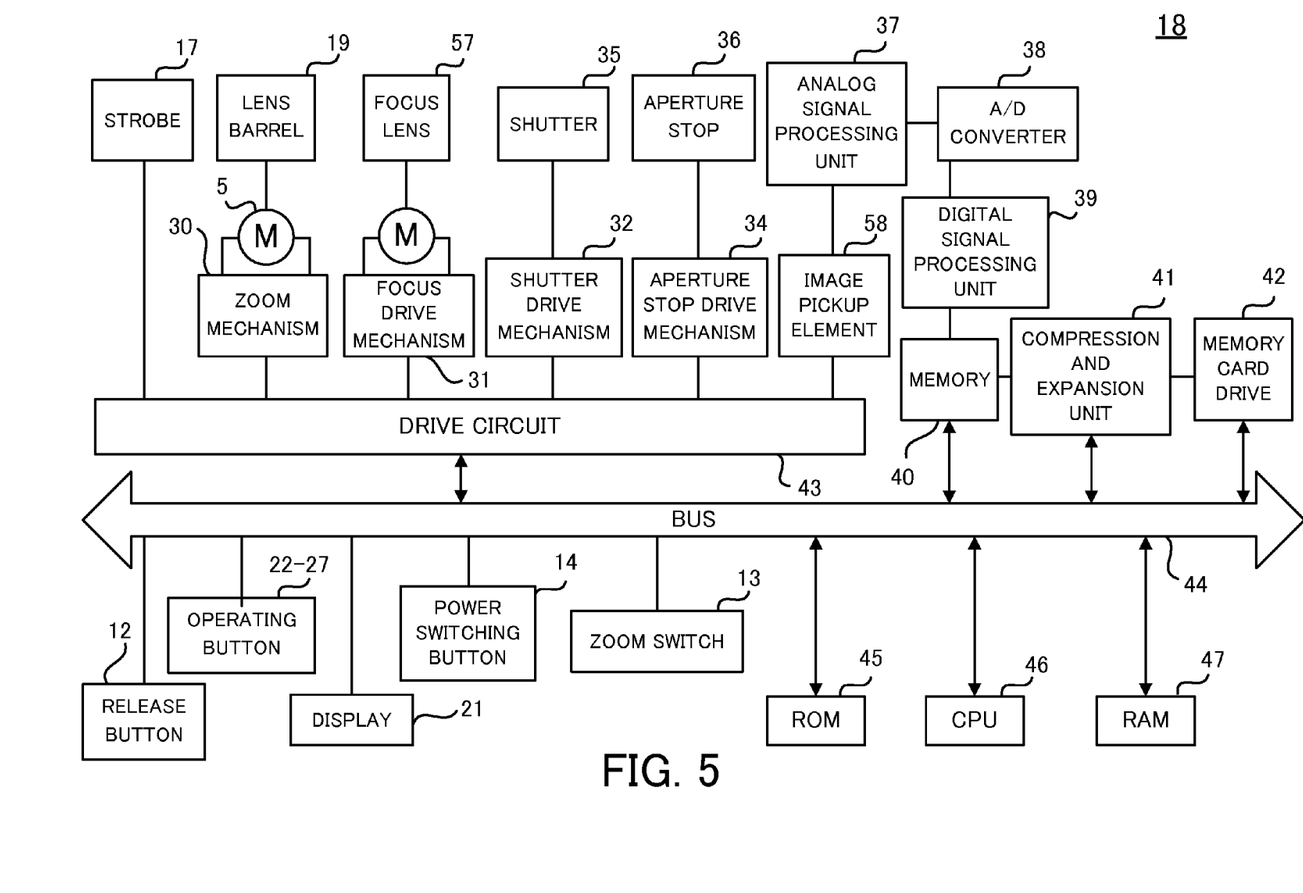
FIG. 5 is a control block diagram of the image pickup apparatus in the embodiment.

Subsequently, referring to FIG. 5, a control configuration of the image pickup apparatus (digital camera 18) will be described. FIG. 5 is a control block diagram of the digital camera 18. A bus 44 is connected to a CPU 46, a ROM 45, a RAM 47, the release button 12, the operating buttons 22 to 27, the display 21, the power switching button 14, the zoom switch 13, a memory 40, a compression and expansion unit 41, the memory card drive 42, and a drive circuit 43.

The drive circuit 43 is connected to a zoom mechanism 30 that drives the lens barrel 19 via a zoom motor 5, a focus drive mechanism 31 that drives a focus lens 57, a shutter drive mechanism 32 that drives a shutter 35, and an aperture stop drive mechanism 34 that drives an aperture stop 36. The drive circuit 43 is also connected to an image pickup element 58 such as a CCD sensor or a CMOS sensor, and the strobe 17. The image pickup element 58 photoelectrically converts an optical image (object image) to output an image signal. The drive control of each unit that is connected to the drive circuit 43 is performed based on a signal from the CPU 46 via the drive circuit 43.

The ROM 45 stores various control programs. The RAM 47 stores data required for the various control programs. An analog signal processing unit 37 performs analog processing for image data outputted from the image pickup element 58, and outputs the processed data to an A/D converter 38. The A/D converter 38 converts analog data obtained from the image pickup element 58 to digital data, and outputs the digital data to a digital signal processing unit 39. The digital signal processing unit 39 performs predetermined processing for the digital data converted by the A/D converter 38, and outputs the data as image data to the memory 40.

The compression and expansion unit 41 performs compression processing such as JPEG or TIFF for the image data stored in the memory 40 based on the operation of the operating button 23. After the compression and expansion unit 41 performs the compression processing for the image data, the processed data are outputted and stored in a memory card that is attached to the memory card drive 42. The compression and expansion unit 41 performs expansion processing for the image data stored in the memory 40 or the image data stored in the memory card. After the expansion processing is performed for the image data, the display 21 (display unit) is capable of displaying the image data via the bus 44. A user see the image displayed on the display 21, and can delete the image by the operation of the operating button 24 when the user determines that the image is not necessary.

Figure 6:
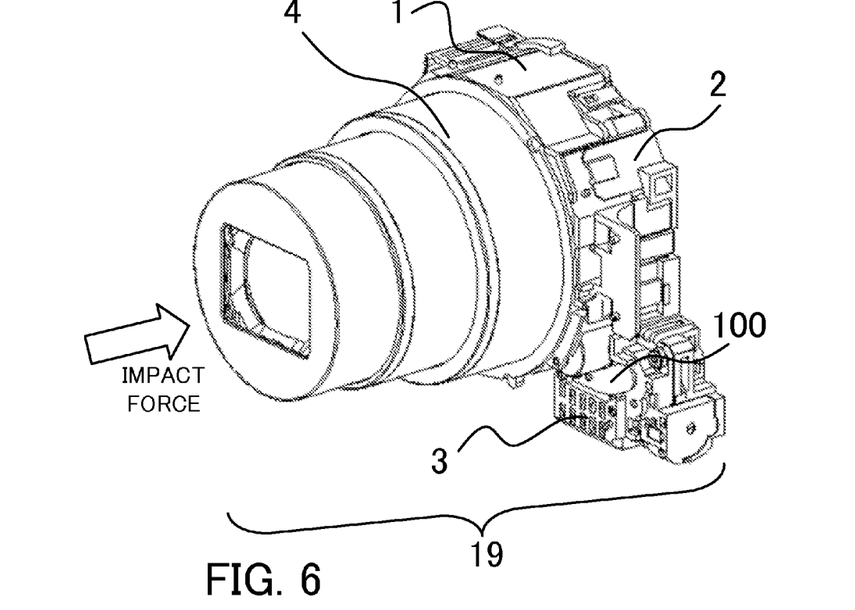
FIG. 6 is a perspective view of a lens barrel in the embodiment.
Figure 7:
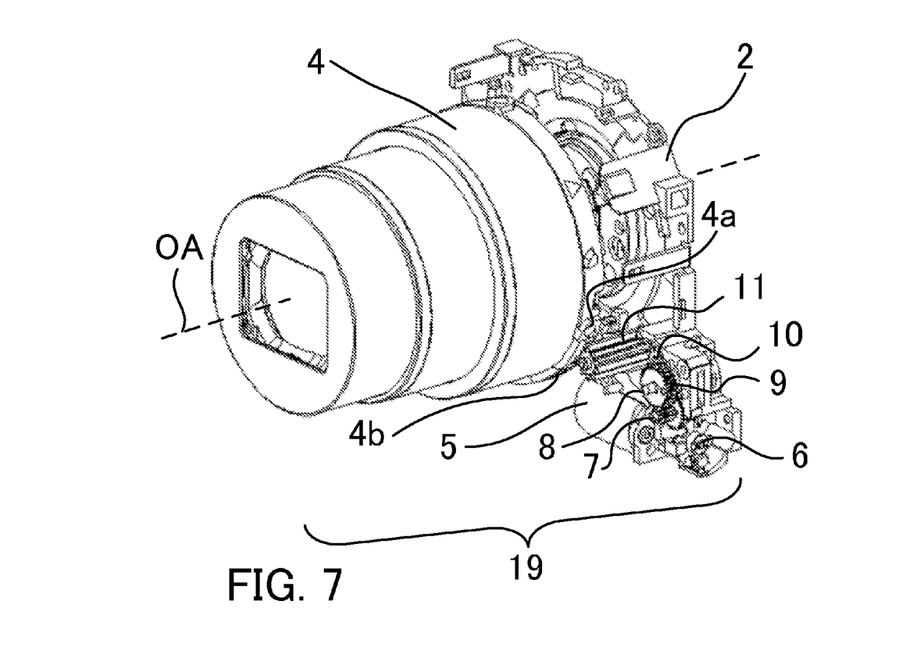
FIG. 7 is a perspective view of the lens barrel in a state where a fixed cylinder and a gear cover are removed in the embodiment.

Next, referring to FIG. 6 to FIGS. 12A to 12C, the lens barrel 19 of the embodiment will be described. FIG. 6 is a perspective view of the lens barrel 19 in an image capturing state (an extended state). FIG. 7 is a perspective view of the lens barrel 19 in a state where a fixed cylinder 1 and a gear cover 3 (housing unit) are removed.

In FIG. 7, when the zoom motor 5 is driven by the drive circuit 43 and the zoom mechanism 30 (see FIG. 5), a first gear 6 attached to the zoom motor 5 rotates. In the embodiment, the drive circuit 43, the zoom mechanism 30, and the zoom motor 5 constitute a drive unit that drives the lens barrel 19 (barrel unit) to be extended.

A rotational force (torque) of the first gear 6 is transmitted to a second gear 7, a first clutch gear (first gear), a second clutch gear 9 (second gear), a fourth gear 10, and a fifth gear 11 in this order. Based on a rotational force transmitted to the fifth gear 11, a cam cylinder 4 of the lens barrel 19 rotates. Accordingly, a follower 4a of the cam cylinder 4 moves in a direction of an optical axis OA (in the optical axis direction) along a cam groove (not illustrated) provided on an inner surface of the fixed cylinder 1, and thus the lens barrel 19 is in the photographing state. In the embodiment, the first gear 6, the second gear 7, a third gear (the first clutch gear 8, the second clutch gear 9, and a spring 100 described below), the fourth gear 10, and the fifth gear 11 constitute a transmission mechanism (transmission unit) of a barrel drive force. In this configuration, the transmission unit transmits the drive force of the drive unit (the drive circuit 43, the zoom mechanism 30, and the zoom motor 5) to the barrel unit (cam cylinder 4).

In the image capturing state illustrated in FIG. 6, when a load (impact force, or external force) in a compression direction (optical axis direction) is applied to the lens barrel 19 by falling the digital camera 18 carelessly or the like, the cam cylinder 4 tries to move in a retracting direction while rotating along the cam groove. In this time, the rotational force is transmitted from the fifth gear 11 to the zoom motor 5. In many case, however, the strength of the barrel drive unit (power transmission unit) is set to the minimum strength required to withstand the drive force of the zoom motor 5 in order to reduce the size of the lens barrel 19. Therefore, when the rotational force not less than the drive force of the zoom motor 5 is applied to the barrel drive unit, there is a possibility that elements such as gears which constitute the barrel drive unit are damaged.

Figure 8:
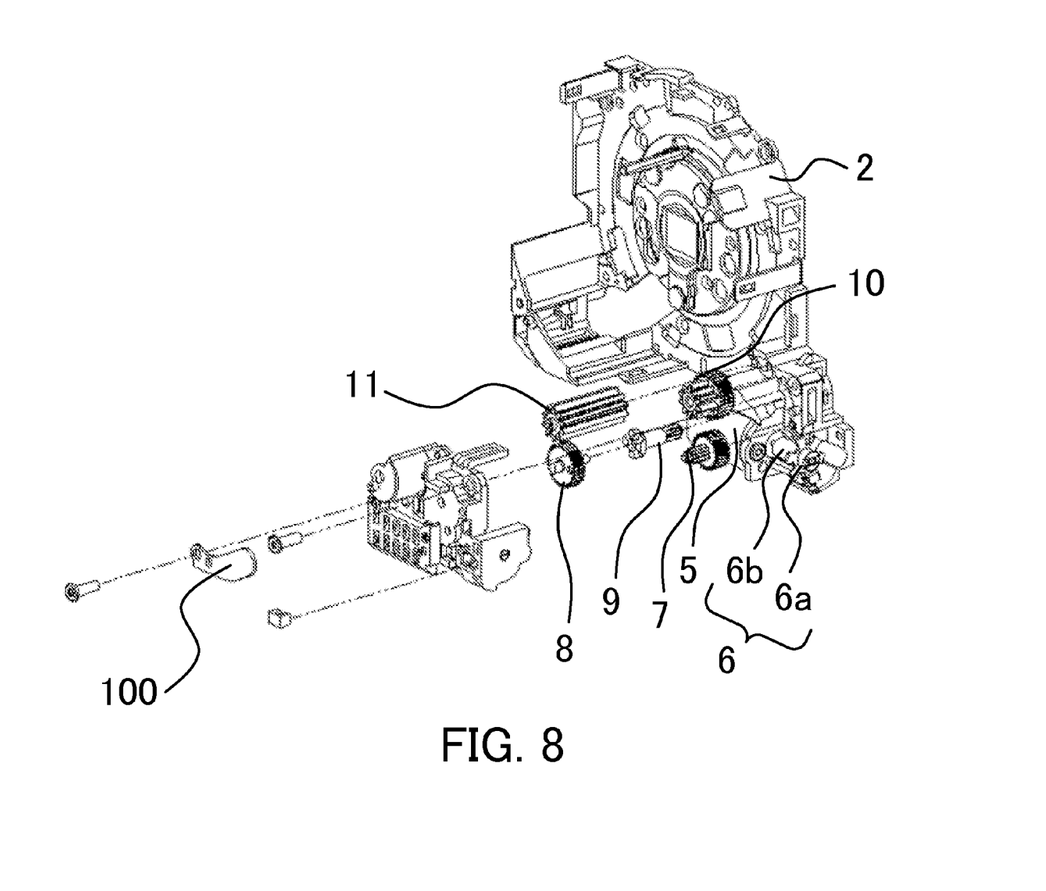
FIG. 8 is an exploded perspective view of the lens barrel (a barrel drive unit) in the embodiment.

FIG. 8 is an exploded perspective view of the lens barrel 19 (barrel drive unit). The first gear 6 as a worm gear is attached to the zoom motor 5. A blade portion 6a for detecting the number of rotations is provided at an end of the first gear 6. The blade portion 6a, a first photo sensor attached to the gear cover 3, and a second photo sensor attached to a barrel plate 2 enable detecting the number of rotations of the zoom motor 5. An image pickup element 58 (see FIG. 5) is attached to the barrel plate 2. The second gear 7 is disposed next to the first gear 6, and a worm portion 6b of the first gear 6 and a large gear portion of the second gear 7 are provided so as to engage with each other. A clutch mechanism (third gear) is disposed next to the second gear 7, and a small gear portion of the second gear 7 and the first clutch gear 8 are provided so as to engage with each other. In the embodiment, the clutch mechanism (third gear) is configured by the first clutch gear 8, the second clutch gear 9, and the plate spring 100.

The fourth gear 10 is disposed next to the clutch mechanism, and the second clutch gear 9 and a large gear portion of the fourth gear 10 are provided so as to engage with each other. The fifth gear 11 is disposed next to the fourth gear 10, and a small gear portion of the fourth gear 10 and the fifth gear 11 are provided so as to engage with each other. The fifth gear 11 is disposed so as to engage with a gear portion 4b provided on the cam cylinder 4. The gear cover 3 is provided so as to cover each gear. The plate spring 100 (biasing member) is provided on an upper surface of the gear cover 3. The gear cover 3 and the plate spring 100 are integrally connected to the barrel plate 2 by using a screw. Alternatively, the plate spring 100 may be formed integrally with the gear cover 3.

Figure 9:
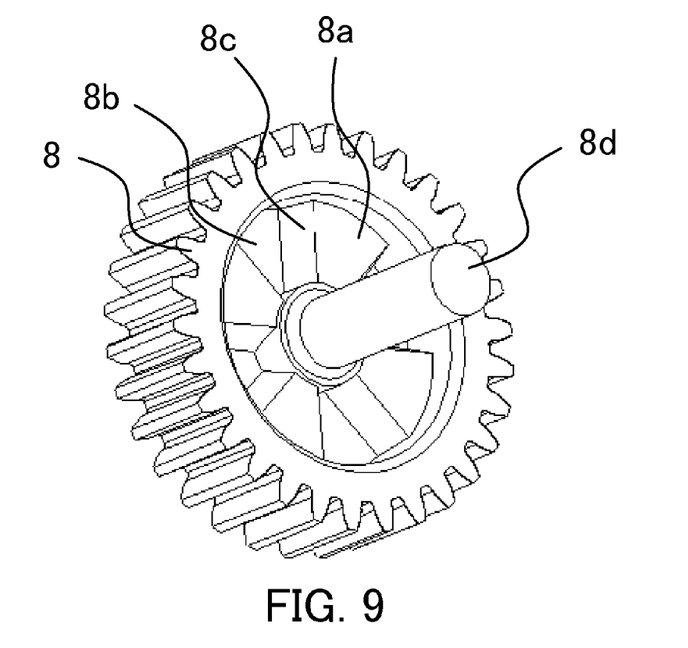
FIG. 9 is a perspective view of the clutch mechanism (a first clutch gear) in the embodiment.
Figure 10:
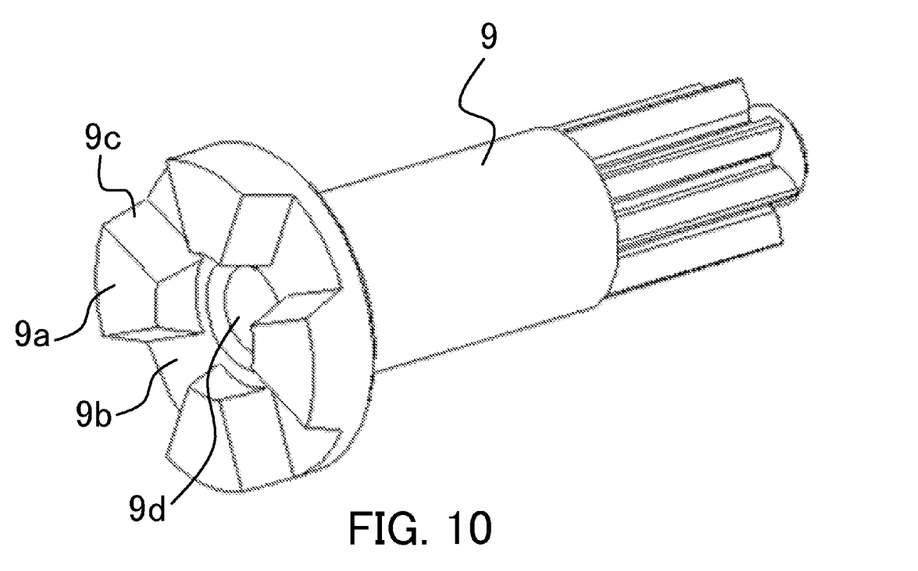
FIG. 10 is a perspective view of the clutch mechanism (a second clutch gear) in the embodiment.
Figure 11A:
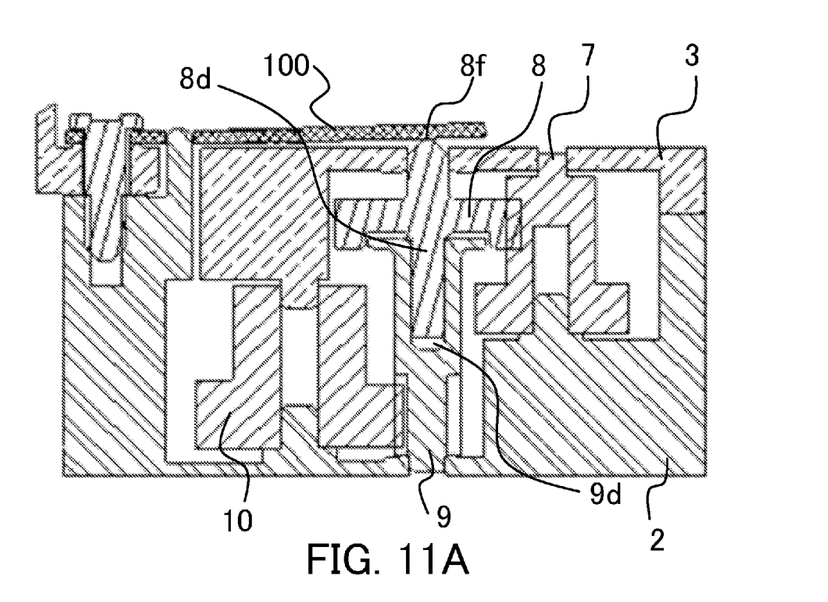
FIGS. 11A and 11B are cross-sectional views of the clutch mechanism in the embodiment.
Figure 11B:
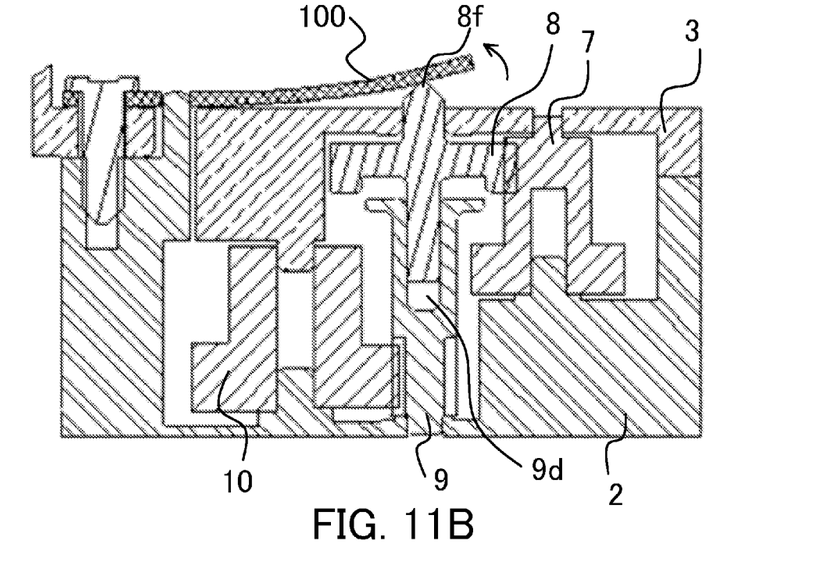

FIG. 9 is a perspective view of the first clutch gear 8. FIG. 10 is a perspective view of the second clutch gear 9. FIGS. 11A and 11B are cross-sectional views of the clutch mechanism. In the embodiment, the clutch mechanism is configured by the first clutch gear 8, the second clutch gear 9, and the plate spring 100. As illustrated in FIG. 9, a convex portion 8a (first clutch gear convex portion) and a concave portion 8b (first clutch gear concave portion) are formed on the first clutch gear 8. A drive shaft 8d (first clutch gear drive shaft) is integrally formed at the center of the first clutch gear 8. A slope portion 8c (first clutch gear slope portion) which is set at an arbitrary angle is formed between the convex portion 8a and the concave portion 8b of the first clutch gear 8. The convex portions 8a and the concave portions 8b are alternately provided circumferentially centered around the drive shaft 8d.

As illustrated in FIG. 10, a convex portion 9a (second clutch gear convex portion) and a concave portion 9b (second clutch gear concave portion) are formed on the second clutch gear 9. A hole portion 9d (second clutch gear hole portion) is formed at the center of the second clutch gear 9. The convex portions 9a and the concave portions 9b are alternately provided circumferentially centered around the hole portion 9d. A slope portion 9c (second clutch gear slope portion) which is set at an arbitrary angle is formed between the convex portion 9a and the concave portion 9b.

As illustrated in FIGS. 11A and 11B, the clutch mechanism is configured by the first clutch gear 8, the second clutch gear 9, and the plate spring 100. In the embodiment, the plate spring 100 is disposed outside the first clutch gear 8, the second clutch gear 9, and the gear cover 3. Therefore, the size of the clutch mechanism (the first clutch gear 8 and the second clutch gear 9) can be reduced. In addition, since the space to provide the plate spring 100 can be sufficiently ensured, the degree of freedom of designing the spring is improved and a stable clutch operation is possible. Furthermore, since the plate spring 100 can remove a backlash of the gear, it contributes to reduction of the noise of the barrel drive unit.

FIG. 11A is a cross-sectional view of the clutch mechanism in a driving state of the lens barrel 19. In the driving state of the lens barrel 19, the drive shaft 8d of the first clutch gear 8 is inserted into the hole portion 9d of the second clutch gear 9. In this state, the convex portion 8a of the first clutch gear 8 fits into the concave portion 9b of the second clutch gear 9, and the convex portion 9a of the second clutch gear 9 fits into the concave portion 8b of the first clutch gear 9. In this case, the plate spring 100 biases (urges against) a bearing portion 8f (first clutch gear bearing portion) of the first clutch gear 8 which is integrally coaxially formed on the drive shaft 8d of the first clutch gear 8. In this configuration, the first clutch gear 8 and the second clutch gear 9 are integrally rotated by the drive (rotational force) of the zoom motor 5. In the embodiment, preferably, the bearing portion 8f is formed hemispherically in order to reduce a sliding load on the plate spring 100.

FIG. 11B is a cross-sectional view of the clutch mechanism in a clutch working state. When an impact force (load, or external force) is applied to an end of the lens barrel 19 as illustrated in FIG. 6, the cam cylinder 4 rotates and the rotational force from the cam cylinder 4 is transmitted to the fifth gear 11 and the fourth gear 10 in this order. The rotational force transmitted to the fourth gear 4 is transmitted to the second clutch gear 9. In this case, a relative position between the first clutch gear 8 and the second clutch gear 9 is shifted so as to increase the distance between the first clutch gear 8 and the second clutch gear 9 by a height of the convex portion 8a of the first clutch gear or the convex portion 9a of the second clutch gear 9. In this case, as indicated by an arrow in FIG. 11B, the plate spring 100 is elastically deformed by the height of the convex portion 9a of the second clutch gear 9. As a result, the fitting of the first clutch gear 8 and the second clutch gear 9 is released, and the second clutch gear 9 spins out. In this configuration, the rotational force transmitted from the cam cylinder 4 is not transmitted to the first gear 6. Therefore, the damage of the barrel drive unit can be effectively avoided.

Figure 12A:
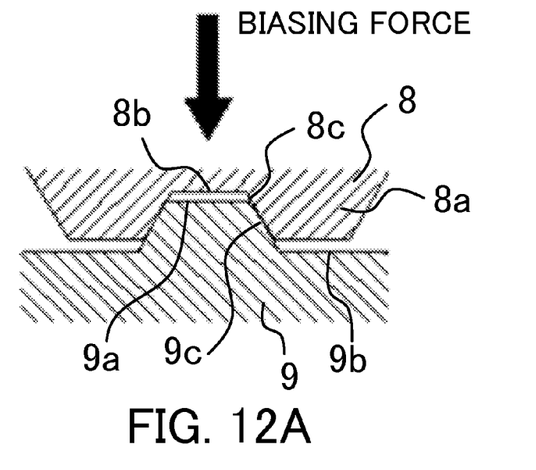
FIGS. 12A to 12C are schematic diagrams of illustrating operations of the clutch mechanism in the embodiment.
Figure 12B:
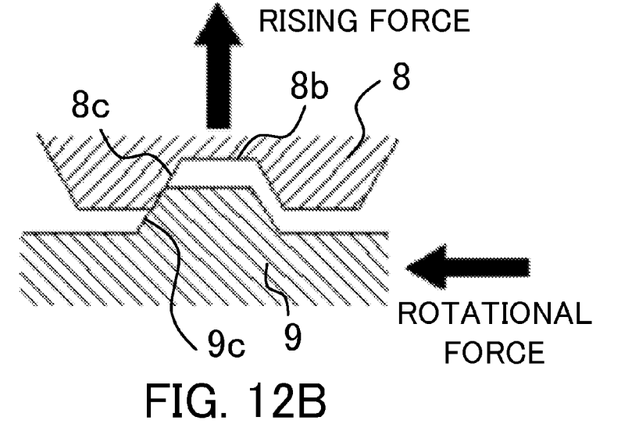
Figure 12C:
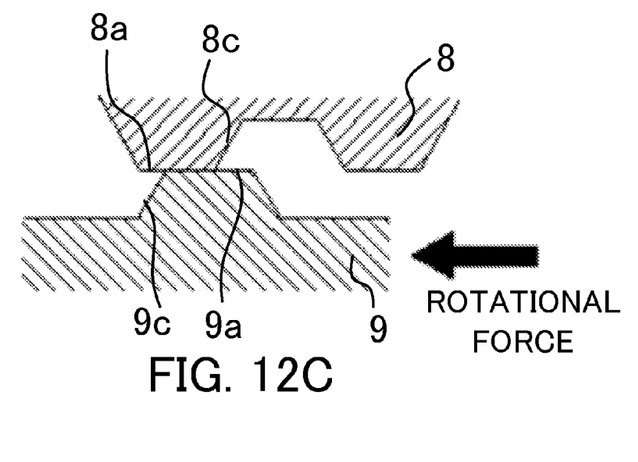

Subsequently, referring to FIGS. 12A to 12C, the operation of the clutch mechanism will be described. FIGS. 12A to 12C are schematic diagrams of illustrating the operation of the clutch mechanism. FIG. 12A is a schematic diagram of the clutch mechanism at the time of driving based on the rotational force by the zoom motor 5 (in the driving state of the lens barrel 19). In this time, the first clutch gear 8 is biased (energized) in a direction of the second clutch gear 9 (a downward direction in FIG. 12A) by a biasing force of the plate spring 100. Therefore, the slope portion 8c of the first clutch gear 8 contacts the slope portion 9c of the second clutch gear 9, and the first clutch gear 8 and the second clutch gear 9 integrally rotate.

FIG. 12B is a schematic diagram of the clutch mechanism at the time of starting the operation. When the impact force (load) is applied to the end of the lens barrel and the rotational force of the fourth gear 10 is transmitted to the second clutch gear 9 as indicated by an arrow in FIG. 12B, the slope portion 8c of the first clutch gear 8 is moved up by the slope portion 9c of the second clutch gear 9. In the embodiment, when the rising force of the first clutch gear 8 indicated by the arrow in FIG. 12B is larger than the biasing force of the plate spring 100 indicated by an arrow in FIG. 12A, the clutch mechanism operates. Therefore, the biasing force of the plate spring 100 is set to be larger than the rising force of the first clutch gear 8 which is generated by the rotational force of the zoom motor 5. This is because the clutch mechanism operates in the driving state of the lens barrel 19, i.e. at the time of rotation by the drive of the zoom motor 5, when for example the biasing force of the plate spring 100 is smaller than the rising force of the first clutch gear 8 which is generated by the rotational force of the zoom motor 5.

FIG. 12C is schematic diagram of the clutch mechanism during its operation. The slope portion 8c of the first clutch gear 8 moves along the slope portion 9c of the second clutch gear 9, and the first clutch gear 8 moves away from the second clutch gear 9. Then, the convex portion 8a of the first clutch gear 8 runs on the convex portion 9a of the second clutch gear 9. Repeating the operations described above, the clutch mechanism operates.

Thus, in the embodiment, the transmission unit includes the first clutch gear 8 (a first gear) and the second clutch gear 9 (a second gear) both of which are coaxially disposed. Furthermore, the transmission unit includes the plate spring 100 (biasing member) which biases (urges against) the first clutch gear 8 so as to transmit the drive force between the first clutch gear 8 and the second clutch gear 9. In this configuration, the transmission of the drive force between the first clutch gear 8 and the second clutch gear 9 is blocked depending on the rotational force which is applied to the second clutch gear 9. For example, the rotational force occurs in the second clutch gear 9 by the external force applied to the lens barrel 19 (barrel unit).

In the embodiment, preferably, the rotational force generates a reaction force (rising force) which is larger than the biasing force of the biasing member (plate spring 100) for the first clutch gear 8 and thus the transmission of the drive force between the first clutch gear 8 and the second clutch gear 9 is blocked. More preferably, the biasing member biases (urges against) the first clutch gear 8 such that the first clutch gear 8 and the second clutch gear 9 engage with each other. When the reaction force is applied, the first clutch gear 8 and the second clutch gear 9 are configured so as to release the engagement between the first clutch gear 8 and the second clutch gear 9. Preferably, the first clutch gear 8 and the second clutch gear 9 constitute a two-stage gear. Preferably, the biasing member is elastically deformed by the reaction force, and thus the first clutch gear 8 and the second clutch gear 9 are configured so as to move away from each other in a rotational axis direction.

Preferably, the first clutch gear 8 includes the drive shaft 8*d*, and the plurality of convex portions 8*a* and concave portions 8*b* alternately provided around the drive shaft 8*d*. The second clutch gear 9 includes the hole portion 9*d*, and the plurality of convex portions 9*a* and concave portions 9*b* alternately provided around the hole portion 9*d*. The first clutch gear 8 and the second clutch gear 9 engage with each other by insertion of the drive shaft 8*d* of the first clutch gear 8 into the hole portion 9*d* of the second clutch gear 9. More preferably, the slope portions 8*c* and 9*c* are formed between the plurality of convex portions 8*a* and 9*a* and the plurality of concave portions 8*b* and 9*b*, respectively. Preferably, the first clutch gear 8 includes an end portion (bearing portion 8*f*) of the drive shaft 8*d* which is provided at a side opposite to the second clutch gear 9. The biasing member biases the end portion (bearing portion 8*f*) of the drive shaft 8*d*, and thus the first clutch gear 8 is biased. More preferably, the end portion (bearing portion 8*f*) of the drive shaft 8*d* is formed hemispherically.

Preferably, the lens barrel further includes the gear cover 3 (housing unit) which covers the first clutch gear 8 and the second clutch gear 9. The biasing member, which is a plate elastic member, is attached to the gear cover 3 or is formed integrally with the gear cover 3.

According to the embodiment, a lens barrel and an image pickup apparatus capable of performing a stable operation without increasing in size of a clutch mechanism can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the lens barrel of the embodiment is configured to be integrally with the image pickup apparatus (digital camera 18) including the image pickup element 58, but is not limited to this configuration. The embodiment is applicable also to a lens barrel which is configured separately from an image pickup apparatus. In the embodiment, the plate spring 100 is configured to bias the first clutch gear 8, but is not limited to this configuration. Alternatively, the plate spring may be configured to bias the second clutch gear 9 instead of the first clutch gear 8. In this case, the second clutch gear 9 moves away from the first clutch gear 8 depending on the rotational force generated by the external force.

This application claims the benefit of Japanese Patent Application No. 2013-248882, filed on Dec. 2, 2013, which is hereby incorporated by reference herein in its entirety.

What is claimed is:

1. A lens barrel comprising:
   an extendable barrel unit;
   a drive unit configured to drive the barrel unit so as to extend the barrel unit; and
   a transmission unit configured to transmit a drive force of the drive unit to the barrel unit,
   wherein the transmission unit includes:
   a first gear and a second gear coaxially disposed, and
   a biasing member configured to bias at least one of the first gear and the second gear such that the drive force is transmitted between the first gear and the second gear, and
   wherein the transmission unit is configured to block transmission of the drive force between the first gear and the second gear depending on a rotational force applied to at least one of the first gear and the second gear,
   wherein the rotational force causes generation of a reaction force that is larger than a biasing force of the biasing member to block the transmission of the drive force between the first gear and the second gear,
   wherein the first gear and the second gear are configured to move away from each other in a rotational axis direction by elastic deformation of the biasing member caused by the reaction force, and
   wherein the first gear includes a drive shaft having an end portion which is provided at a side opposite to the second gear, and wherein the biasing member is configured to bias the end portion of the drive shaft to bias the first gear.

2. The lens barrel according to claim 1,
   wherein the rotational force occurs in at least one of the first gear and the second gear by an external force applied to the barrel unit.

3. The lens barrel according to claim 1,
   wherein the biasing member is configured to:
   bias at least one of the first gear and the second gear such that the first gear and the second gear engage with each other, and
   release engagement between the first gear and the second gear when the reaction force is applied.

4. The lens barrel according to claim 1,
   wherein the first gear and the second gear constitute a two-stage gear.

5. The lens barrel according to claim 1,
   wherein the first gear includes a plurality of convex portions and concave portions alternately provided around the drive shaft,
   wherein the second gear includes a hole portion and a plurality of convex portions and concave portions alternately provided around the hole portion, and
   wherein the first gear and the second gear are configured to engage with each other by insertion of the drive shaft of the first gear into the hole portion of the second gear.

6. The lens barrel according to claim 5,
   wherein the first gear is provided with a slope portion between each of the plurality of convex portions and each of the plurality of concave portions thereof, and
   the second gear is provided with a slope portion between each of the plurality of convex portions and each of the plurality of concave portions thereof.

7. The lens barrel according to claim 1,
   wherein the end portion of the drive shaft is formed hemispherically.

8. The lens barrel according to claim 1, further comprising a housing unit configured to cover the first gear and the second gear,
   wherein the biasing member is a plate elastic member and is attached to the housing unit.

9. The lens barrel according to claim 1, further comprising a housing unit configured to cover the first gear and the second gear,
   wherein the biasing member is a plate elastic member and is formed integrally with the housing unit.

10. An image pickup apparatus comprising:
    an image pickup element configured to photoelectrically convert an optical image to output an image signal;
    an extendable barrel unit;
    a drive unit configured to drive the barrel unit so as to extend the barrel unit; and
    a transmission unit configured to transmit a drive force of the drive unit to the barrel unit, wherein the transmission unit includes:

a first gear and a second gear coaxially disposed, and a biasing member configured to bias at least one of the first gear and the second gear such that the drive force is transmitted between the first gear and the second gear, and wherein the transmission unit is configured to block transmission of the drive force between the first gear and the second gear depending on a rotational force applied to at least one of the first gear and the second gear, wherein the rotational force causes generation of a reaction force that is larger than a biasing force of the biasing member to block the transmission of the drive force between the first gear and the second gear, wherein the first gear and the second gear are configured to move away from each other in a rotational axis direction by elastic deformation of the biasing member caused by the reaction force, and wherein the first gear includes a drive shaft having an end portion which is provided at a side opposite to the second gear, and wherein the biasing member is configured to bias the end portion of the drive shaft to bias the first gear.

* * * * *